Sept. 6, 1966     W. R. EPPERLY ET AL     3,271,303
PROCESS FOR DISPLACING AGENT CONTAINMENT
Filed Dec. 24, 1962     4 Sheets-Sheet 3
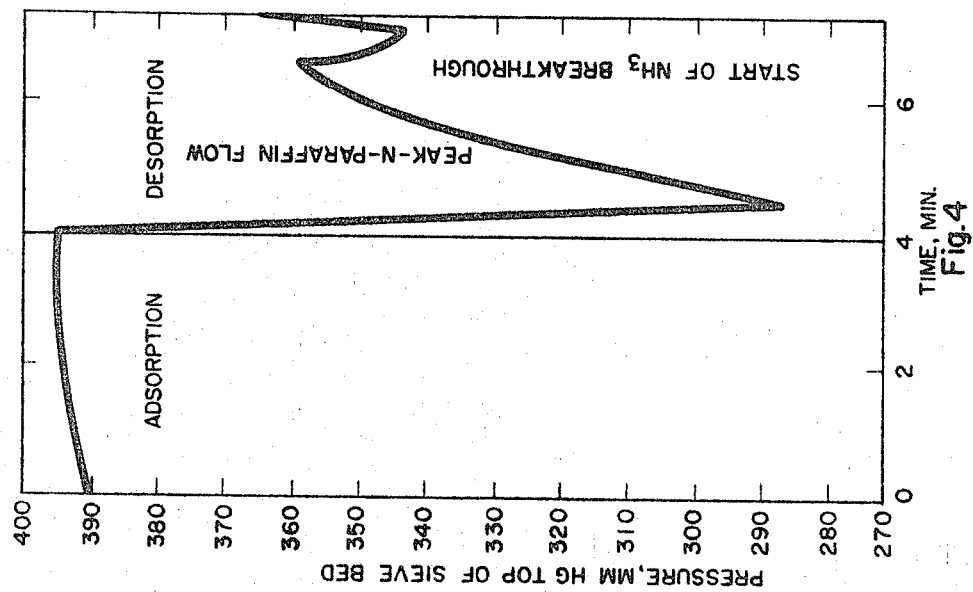
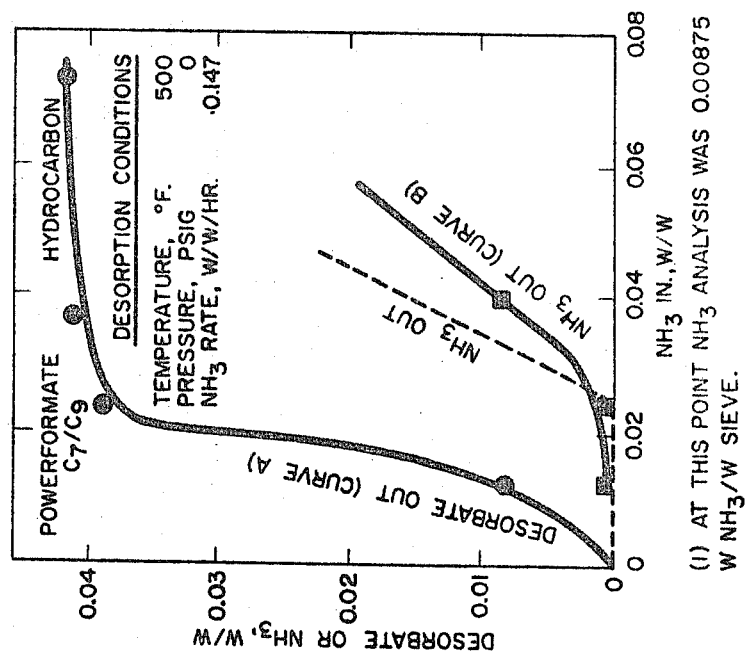
William R. Epperly
Charles W. Tyson, Jr.    Inventors
By *David A. Roth*
Attorney

3,271,303
PROCESS FOR DISPLACING AGENT CONTAINMENT

William R. Epperly, Murray Hill, and Charles W. Tyson, Jr., Westfield, N.J., assignors to Esso Research and Engineering Company, a corporation of Delaware
Filed Dec. 24, 1962, Ser. No. 246,940
10 Claims. (Cl. 208—310)

This invention relates to separation processes utilizing at least one adsorbent bed wherein materials adsorbed within said adsorbent bed or beds are desorbed with a displacing agent. In particular, it relates to a cyclical process of separating various components utilizing one or more fixed adsorbent beds wherein the material on the adsorbent beds is descorbed by means of a displacing agent which is substantially retained within the adsorbent beds and is not allowed to be removed from the beds with the material being desorbed from the beds. It also relates to a process which can be carried out continuously using just one moving bed of adsorbent.

There are many processes known where separations of various materials are accomplished by using adsorbents. The major classes of such adsorbents commercially available comprise aluminum oxide (alumina), activated carbon, silica gels, clays, and crystalline zeolites. They are all so well known as not to warrant further description. It is disclosed in copending application S. N. 38,526 filed June 24, 1960, now U.S. Patent No. 3,070,524 that some adsorbents, such as molecular sieves, can be conveniently desorbed by the use of gaseous displacing agents.

In typical processes which utilize adsorbents and displacing agents, the displacing agent is allowed to break through the adsorbent with the desorbed material unless trimmer beds are used. Subsequently the displacing agent and desorbate had to be separated from each other in order to remove the displacing agent for reuse as well as to recover the desorbed material which can be, in some instances, desired product.

It has now been discovered and forms the substance of this invention that extremely effective and economic separations utilizing adsorbent beds can be accomplished by preventing breakthrough of the displacing agent *with* the desorbed material. This process, for the purpose of simplicity, will be referred to herein as "displacing agent containment." In essence, desorption is stopped at a point just prior to displacing agent breakthrough. Normally, on the desorption portion of a fixed bed cycle some displacing agent leaks from the bed initially at a slow rate. At breakthrough this rate is subject to a sharp increase. In fact, breakthrough can be defined as the point where the displacing agent rate increases about 5–25, e.g. 10, times the preceding relatively slow leak rate.

For fixed bed operation a preferable process sequence is as follows. The desorbed adsorbent containing displacing agent is placed on an adsorption cycle. As adsorption takes place in a fixed bed, at least a portion of the retained displacing agent is forced off the adsorbent and after separation from the adsorption effluent e.g. sievate on to an adjacent bed which has been adsorbed. The displacing agent from the bed on adsorption displaces adsorbed material on the adjacent bed which had been on adsorption just previously. Such displacing on the adjacent bed is carried out until just short of breakthrough. This cycle can be repeated as frequently as it is desired. When using fixed beds adsorption and desorption preferably should take place in opposite directions, i.e. upflow for one, downflow for the other.

In essence, the displacing agent is not allowed to break through either adsorbent bed so that the agent can be switched back and forth between the two beds. Thus a "slug" of displacing agent present on one bed is pushed over to another bed where it desorbs and is then pushed over to its original bed. The process can go on ad infinitum.

In one specific embodiment of the invention the process can be carried out in just one fixed bed. As feed is passed over the bed in the adsorption cycle, at least a portion of the retained displacing agent is forced off the adsorbent and into a surge drum after separation from the adsorption effluent. When adsorption is completed, the displacing agent in the surge drum is passed into the bed displacing adsorbed feed components.

Another facet of the invention resides in the use of a moving bed of adsorbent. In this process an adsorption zone is located in communication with a desorption zone. There is a barrier between the two zones with a conduit therein to allow the controlled flow of adsorbent from the adsorption zone to the desorption zone. Displacing agent enters the bottom of the desorption zone and desorbate comes off the top of the desorption zone.

Feed enters the bottom of the adsorption zone and adsorption effluent and displacing agent come off the top of the adsorption zone.

Adsorbent having primarily displacing agent adsorbed thereon passes out of the bottom of the desorption zone and is conveyed to the top of the adsorption zone where it meets ascending feed. The adsorbent adsorbs feed components and passes through the barrier to the desorption zone. There it contacts ascending displacing agent which is adsorbed on the adsorbent. The desorbate passes out of the top of the adsorption zone.

In practice, with both the fixed bed and moving bed processes there are small losses of displacing agent which must be made up from time to time. Preferably less than 6% of the displacing agent entering the bed is allowed to leave the bed upon desorption. Even more preferably, less than 4% displacing agent is permitted to leave a bed upon desorption and, most preferably, less than 2% is permitted to leave a bed upon adsorption.

One of the significant advantages of the instant invention is that large-scale apparatus, such as a compressor, to recycle displacing agent, can be eliminated since the displacing agent need not be recovered from desorbate and pumped through the system again. Another is that for systems in which the boiling points of the desorbate and displacing agent are close together, an expensive fractionation step to separate the components is eliminated.

As an example of the application of the invention, reference is made to the separation of normal paraffins from isoparaffins. It is to be emphasized that numerous other types of separations can be similarly effected. The separation of n-paraffins from saturated, non-linear hydrocarbons or aromatic hydrocarbons or mixtures thereof either for the purpose of enriching the mixture in branched chain, cyclic, or aromatic components or for isolating and recovering the normal isomers has become increasingly important to industry.

Thus, in the preparation of jet and diesel fuels, the presence of n-paraffins degrades tthe freezing point rating. On the other hand, in the manufacture of synthetic detergents such as alkyl, aryl sulfonates, a straight chain alkyl substituent makes for better detergency and biodegradable characteristics than a branch chain substituent of the same number of carbon atoms. Conversely, in gasolines which contain a mixture of approximately $C_4$ to $C_{12}$ hydrocarbons the presence of n-paraffin substituents causes a lowering of octane rating. Separations of n-paraffins from isoparaffins are conveniently effected with 5 A. molecular sieves.

As another illustrative example, Type X molecular sieves can be used for separation of aromatics, sulfur, and/or color bodies from saturates and olefins, or aromatics, sulfur, color bodies and/or olefins from saturates.

In copending application S.N. 38,256 it is proposed that a 4 A. trimmer bed be utilized on a 5 A. adsorbent bed to contain the displacing agent. However, for most applications, the use of the containment principle is a significant improvement over the use of trimmer beds since it results in a process that does not need a trimmer bed. Moreover, use of a trimmer bed is unsatisfactory for other reasons. For instance, the use of a trimmer bed adds additional capital investment for what is, after all, only "dead weight," since the trimmer bed adsorbent adds nothing to the actual separations desired. The trimmer bed also provides adsorption sites for nonselective adsorption in the binder and on the surface of the 4 A. crystals. In addition, the trimmer bed is limited to systems in which the displacing agent has a smaller molecular cross section than the adsorbate since a size separation is effected as displacing agent is removed from desorbate. In the present invention, the displacing agent can have approximately the same molecular cross section as the adsorbate. Thus, straight chain primary and secondary amines can be used to adsorb normal hydrocarbons from 5 A. sieve, for example.

In 13X separations, the displacing agent can have a larger molecular cross section than the adsorbate since the adsorbate is usually considerably smaller than the adsorbent pore size. It can, of course, have the same cross section or be smaller.

By utilizing the displacing agent containment concept of this invention, trimmer beds can be eliminated altogether with no impairment of separation efficiencies other than a minor reduction in adsorbent capacity depending on feed molecular weight.

Moreover, the process of the invention is particularly useful in the separation of n-paraffins from petroleum or hydrocarbon streams containing them and isoparaffins, aromatics, etc. having a relatively low number of carbon atoms, i.e. about 2 to 30, preferably 2 to 25, more preferably 4 to 15, and especially preferred about 4 to 9 carbon atoms. The about 4 to 9 carbon atom range is especially preferred since it represents an important fuel range, i.e. gasoline as well as commercially important solvents. The adsorbent used for this process is preferably a 5 A. molecular sieve for separating normal hydrocarbons from now normal hydrocarbons. Molecular sieves are well known in the art and are described in detail in a book entitled, "Molecular Sieves" by Charles Hersh published by Reinhold Publishing Corporation, New York (1961). The molecular sieves usable in this invention include all molecular sieves, e.g. the type X sieves as well as molecular sieves specifically mentioned.

By displacing agent is meant a polar material or a material with substantial polarizability compared with normal hydrocarbons, aromatics, sulfur compounds, and olefins. It is intended that the terms "displacing medium" and "displacing agent" have the same meaning.

A preferred displacing agent has the general formula:

wherein $R_1$, $R_2$, and $R_3$ are selected from the group consisting of hydrogen and $C_1$ to $C_5$ alkyl radicals. Thus, preferred displacing agents include $NH_3$ and $C_1$ to $C_5$ primary, secondary, and teriary amines with $NH_3$ being most preferred and the $C_1$ to $C_5$ primary amines being next in order of preference. Other suitable desorbing mediums include CO, NO, $SO_2$, $CO_2$, $C_1$ to $C_5$ alcohols, glycols, halogenated compounds such as methyl and ethyl chloride and methyl fluoride and nitrated compounds such as nitro methane. Generally, any compound that has at least one polar bond of a greater polarizability potential compared with the material to be desorbed, which can enter the molecular sieve, which has a heat of adsorption that is substantial compared with the material to be desorbed and which is perferentially adsorbed under the desorption conditions described herein, can be used as a displacing agent. These displacing agents are preferably used in their gaseous state.

Copending application S.N. 38,526 is directed to a concept wherein displacing agent must be in the feed to achieve satisfactory separation results. In contrast, by employing the process of the instant invention, very excellent results can be obtained without using displacing agent in the feed. Table I following, summarizes the operating, preferred, and the especially preferred conditions for the process of the invention including both fixed bed and moving bed aspects.

| | Operating | Preferred | Especially Preferred |
|---|---|---|---|
| Adsorption (per cycle): | | | |
| Temperature, ° F | 70 to 800 | 400 to 750 | 500 to 700. |
| Pressure, p.s.i.a. | 0.5 to 500 | 1 to 50 | 1 to 40. |
| Total Average Feed Rate, w./w./hr.¹ | 0.01 to 10 | 0.1 to 5 | 0.2 to 1. |
| Feed/Cycle, w./w. | 0.001 to 5 | 0.01 to 0.5 | 0.03 to 0.3. |
| Feed | $C_2$ to $C_{30}$ | $C_2$ to $C_{25}$ | $C_4$ to $C_9$. |
| Adsorbent ² | | | |
| Adsorbate in feed, percent | 0.0001 to 50 | 0.001 to 35 | 0.1 to 25. |
| Desorption (per cycle): | | | |
| Temperature, ° F | 70 to 800 | 400 to 750 | 500 to 700. |
| Pressure, p.s.i.a. | 0.5 to 500 | 1 to 50 | 1 to 40. |
| Displacing Agent ³ | $NR_1R_2R_3$ | $NH_2R_1$ | $NH_3$. |
| Displacing Agent Rate, w./w./hr. | 0.001 to 5 | 0.01 to 1 | 0.02 to 0.2. |
| Displacing Agent, w./w./cycle | 0.0001 to 0.3 | 0.001 to 0.1 | 0.002 to 0.05. |

¹ Fresh feed plus recycle.
² Adsorbents which can be used include zeolitic molecular sieves such as Type A and Type X (for example 5A, 10X, and 13X), silica gels, aluminas, charcoals, magnesias, and clays.
³ $R_1$, $R_2$, $R_3$ may be H or $C_1$–$C_5$ alkyl groups.

Although the description is considered adequate and the invention can be fully understood by reference to the preceding description and the appended claims, the further description that follows is presented for the purposes of a more detailed and complete explanation.

For the purposes of the following more detailed and complete portion of the specification:

FIGURES 3–5 are graphic representations of some of the data of the examples.

Figure 1:
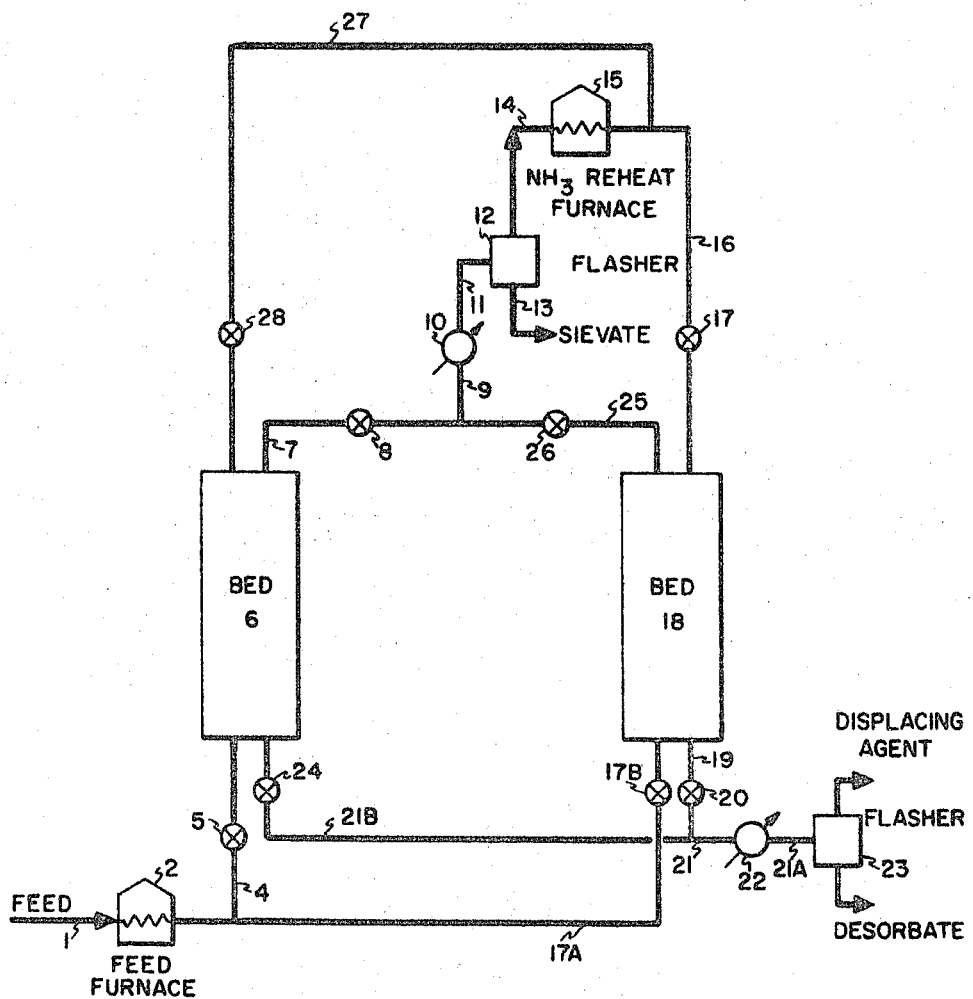
FIGURE 1 is a schematic diagram of a preferred embodiment of a fixed bed process of the invention.

Referring now to FIGURE 1, feed is fed through line 1 into heater 2 and then through lines 2 and 4 and valve 5 to adsorbent bed 6 which contains 5 A. molecular sieve. Bed 6 has been previously desorbed with ammonia, a preferred displacing agent. The feed in this case is a $C_5$ to $C_{10}$ hydrocarbon feed containing 25.5% n-paraffins, 61.8% nonnormal saturates and 12.7 aromatics. Sievate and displacing agent, i.e. ammonia, come out of sieve bed 6 through line 7 and valve 8 and line 9 into heat exchanger condenser 10 to condense sievate and thence through line 11 and into flasher 12. In flasher 12, ammonia is flashed off and sievate can be recovered through line 13. Ammonia is flowed through line 14 through furnace 15 then through line 16 and valve 17 into sieve bed 18. Sieve bed 18 contains 5 A. molecular sieve and has been on an adsorption cycle previously and is now loaded with n-paraffins. Sieve bed 18 is desorbed with desorbate leaving sieve bed 18 through line 19, valve 20, line 21, and into heat exchanger-condenser 22. This desorbate contains no more than about 6% of the total $NH_3$ fed to the bed. The desorption is stopped just short of breakthrough for the particular feed and conditions prevalent. The desorbate which can contain a small amount of displacing agent is flowed through line 21 to flasher 23. From flasher 23 displacing agent and desorbate are taken off separately. The first portion of the desorbate can be recycled to feed, to increase sievate yield, through line 21B and valve 24. If the process is operated under vacuum, a small vacuum pump or steam ejector can be used to remove noncondensables from flasher 23. Prior to ammonia breakthrough, desorption is stopped and the process is reversed with feed going through line 17A and valve 17B into bed 18 and the displacing agent, e.g. ammonia from bed 18 goes through line 25 and valve 26 to line 9 and through elements 10, 11, 12, 13, 14 and 15 as described above, then through line 27 and valve 28 to bed 6 to desorb components adsorbed thereon. In the desorption operation of bed 6 desorption is again stopped just short of breakthrough. Makeup $NH_3$ can be supplied if needed.

As an optional feature, a compressor can be used between sievate flasher 12 and $NH_3$ reheat furnace 15 to raise the desorption pressure substantially above the adsorption pressure.

It should be noted that if the desorption pressure is less than the adsorption pressure, the cycle can be operated with no ammonia compressors. Ammonia is pushed from the adsorbing bed to the desorbing bed by the feed and with ammonia containment recirculation is not required.

It will be understood that although the foregoing specific illustration for FIGURE 1 given above relates to two adsorbent beds, more than two beds can be conveniently used together if desired. Alternatively, if a continuous process sequence is not important, one bed alone could be used wherein the displacing agent is caught in a surge tank for reuse in the desorbent portion of the cycle.

Figure 2:
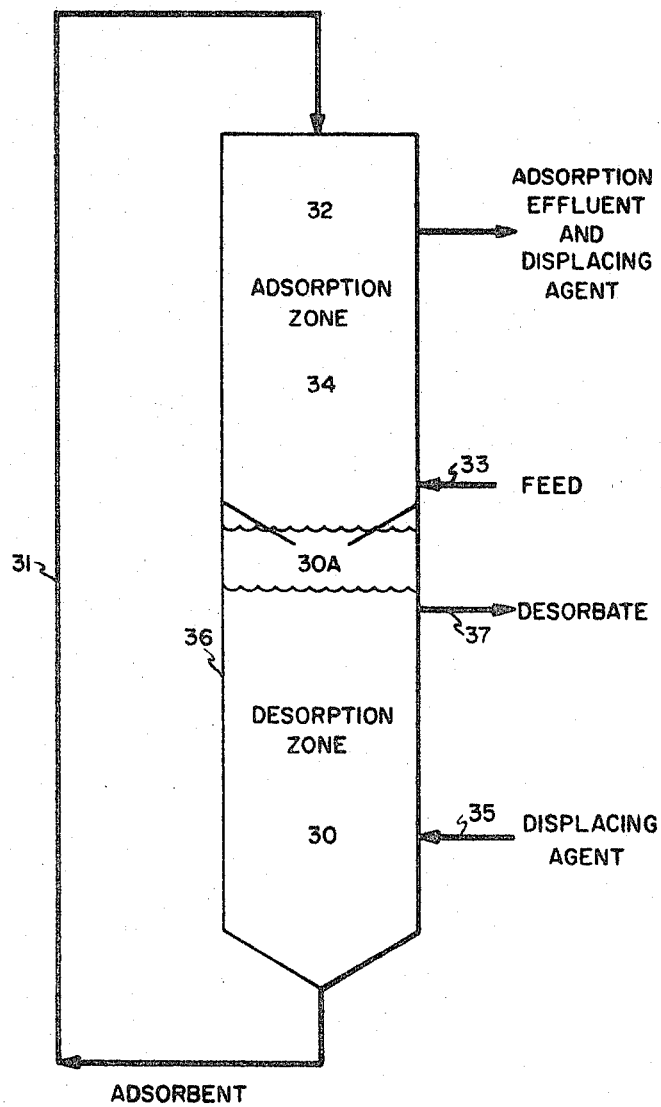
FIGURE 2 is a schematic diagram of a preferred embodiment of a moving bed embodiment of the invention.

As pointed out above, the process can also be carried out by the use of a single moving bed of adsorbent as shown schematically in FIGURE 2. With reference to FIG. 2, adsorbent, which has been desorbed, is taken out of the bottom of desorption zone 30, through line 31 and is passed into adsorption zone 32 and contacted countercurrently with feed which enters zone 32 through line 33. The freshly desorbed adsorbent first contacts adsorption effluent, then feed and then leaves the zone through an orifice in barrier 34. This adsorbent then passes into desorption zone 30 where it is contacted countercurrently with displacing agent which enters zone 30 through line 35. As the adsorbent enters zone 30 it is in contact with desorbate in the subzone of zone 30 which is designated as sub zone 30A. When it leaves subzone 30A it is contacted with fresh displacing agent in zone 30. The flow of displacing agent relative to adsorbent and feed is controlled to prevent breakthrough of displacing agent into the desorbate. The adsorbent is circulated from the bottom of unit 36 to the top by mechanical means or with a gas lift. The subzone of desorbate, 30A is maintained above desorbate removal line 37 so that nonselectively adsorbed components can be purged from the adsorbent with desorbate before the adsorbent reaches the point of desorbate removal from unit 36. In this way, desorbate purity is increased. Adsorption effluent and displacing agent are taken off the top of zone 32 by means of line 38.

The invention is further illustrated by the following examples:

Example 1

A powerformate feed containing 8.8% of $C_7$ to $C_9$ n-paraffins was run through a process similar to that described for FIGURE 1 using 5 A. sieves at an adsorption temperature of 500° F., pressure of 10 p.s.i.g. and at a feed rate of 0.54 w./w./hr. The beds were desorbed at a temperature of 500° F., a pressure of 0 p.s.i.g. and an ammonia rate of 0.147 w./w./hr. It was found that by carrying out the process under these conditions about 90% of total desorption was effected prior to ammonia breakthrough. See FIGURE 3 wherein the pounds of desorbate leaving the bed per pound of sieve, w./w., and the pounds of $NH_3$ leaving the bed per pound of sieve, w./w., are plotted against the pounds of $NH_3$ entering the bed per pound of sieve, w./w. In this example, ammonia analysis was greater than 0.00875 weight of ammonia per weight of sieve at a time in desorption corresponding to 0.04 w./w. of ammonia feed to the bed. In essence, curve A shows quantity of desorbate out and curve B shows quantity of $NH_3$ out. It is apparent that most of the desorbate is out (curve A) before any appreciable quantity of $NH_3$ is out (curve B).

Example 2

A process similar to that described for FIGURE 1 was carried out using a $C_5$–$C_{10}$ virgin distillate and a 5 A. molecular sieve. For adsorption, the temperature was 655° F., the pressure 390–395 millimeters mercury absolute and the feed rate of 0.84 w./w./hr. for a total time of 4 minutes.

The sievate collected in the adsorption step constituted about 75% of total feed. In the second step ammonia was introduced under desorption conditions of 0.12 w./w./hr. of ammonia, a temperature of 700° F. and a pressure of 285–360 mm. of mercury absolute for 3.25 minutes. Ammonia breakthrough was controlled so that it amounted to only 0.5–3% of the total desorbent into the bed. One hundred and ten cycles were run on this feed stock. In these cycles the ammonia breakthrough was as low as 0.5% per cycle based on total ammonia fed per cycle.

A composite of eight of the cycles run on this feed stock is shown schematically in FIGURE 4. This figure shows the point where ammonia breakthrough occurs. It will be noted that the point of ammonia breakthrough lags behind the peak n-paraffin desorbate flow by at least a minute under these particular process conditions. In this example, the sieve's capacity for n-paraffins was 0.011 lb. per pound of sieve per cycle. The n-paraffin desorbate has many various chemical and solvent uses which have been discussed above. The sievate had a substantially improved octane number, e.g. in Example 1 the sievate had a 99.5 octane number as compared with its feed octane of 94.6 while in Example 2 the sievate octane was 61.2 vs. a feed octane of 39.2, and could be added to gasoline directly as well as being suitable for use as a prime feed for reforming since desirable reforming stocks have low paraffin contents. Normal paraffins are troublesome in reforming feedstocks since they tend to crack and form coke in the reformers.

Example 3

A $C_5/C_{10}$ feed containing 1.1% aromatics, 17 p.p.m. sulfur, 90% n-paraffins and 8.9% other saturated hydrocarbons was run through a process similar to that described for FIGURE 1 using 13X sieves at an adsorption temperature of 675°F., pressure of 2 p.s.i.g. and at a feed rate of 0.8 w./w./hr. The bed was desorbed at a temperature of 675° F., a pressure of 0.5 p.s.i.g. and an ammonia rate of 0.1 w./w./hr. Cycle times were 10 minutes on adsorption and 10 minutes on desorption. A normal paraffin sievate containing 0.4% aromatics and 7 p.p.m. sulfur was obtained along with a desorbate stream having 2.5% aromatics and 26 p.p.m. sulfur. The purified normal paraffin yield on fresh feed was 63% and with appropriate desorbate recycle to fresh feed should equal 90 to 95% of fresh feed. Ammonia breakthrough from the bed on desorption was only about 1 to 3% of the total ammonia feed to the bed. Eighty cycles were run under these conditions. The purified n-paraffin sievate has many chemical and solvent uses. The desorbate, which with recycle would be a highly concentrated aromatic fraction, would have an excellent octane rating as part of the motor gasoline pool or use as an aromatic solvent or chemical raw material.

The desorbate recycle referred to in this example and the examples elsewhere in the application applies to the fact that for many processes the first portion of the desorbate is approximately feed composition compared with the final desorbate. Therefore, the first portion of the desorbate is recycled to feed.

*Example 4*

A $C_9/C_{14}$ feed containing 21% aromatics and 1400 wt. p.p.m. sulfur was run through a process similar to that described for FIGURE 1 using 13X molecular sieves at an adsorption temperature of 675° F., pressure of 2 p.s.i.g. and a feed rate of 0.45 w./w./hr. The bed was desorbed at a temperature of 675° F., a pressure of 0 p.s.i.g. and an ammonia rate of 0.06 w./w./hr. Cycle times were 8 minutes on adsorption and 8 minutes on desorption.

A saturate sievate containing 5% aromatics and 11 p.p.m. sulfur was obtained along with a desorbate stream having 35% aromatics and 2700 wt. p.p.m. sulfur. The sievate had a color and colorhold (color after 16 hours at 212° F.) of +31 and +22 Saybolt compared with +13 and −9 for the feed. The saturate sievate yield on fresh feed was 51% and with appropriate recycle could reach 70 to 75% of fresh feed. Ammonia breakthrough from the bed on desorption was only about 1 to 3% of the total ammonia feed to the bed.

Twenty-five cycles were run on this feed under these conditions. The saturate sievate stream would make an excellent thermally stable jet fuel as well as a good solvent or chemical raw material. The desorbate, which with recycle would be a highly concentrated aromatic fraction, could be used as an aromatic solvent or a chemical raw material.

*Example 5*

Under the conditions described in Examples 2, 3, and 4, the amount of ammonia breaking through as a function of time in the desorption step was measured. This was done to establish a suitable definition of the amount of displacing agent which breaks through under the conditions of the invention.

Figure 5:
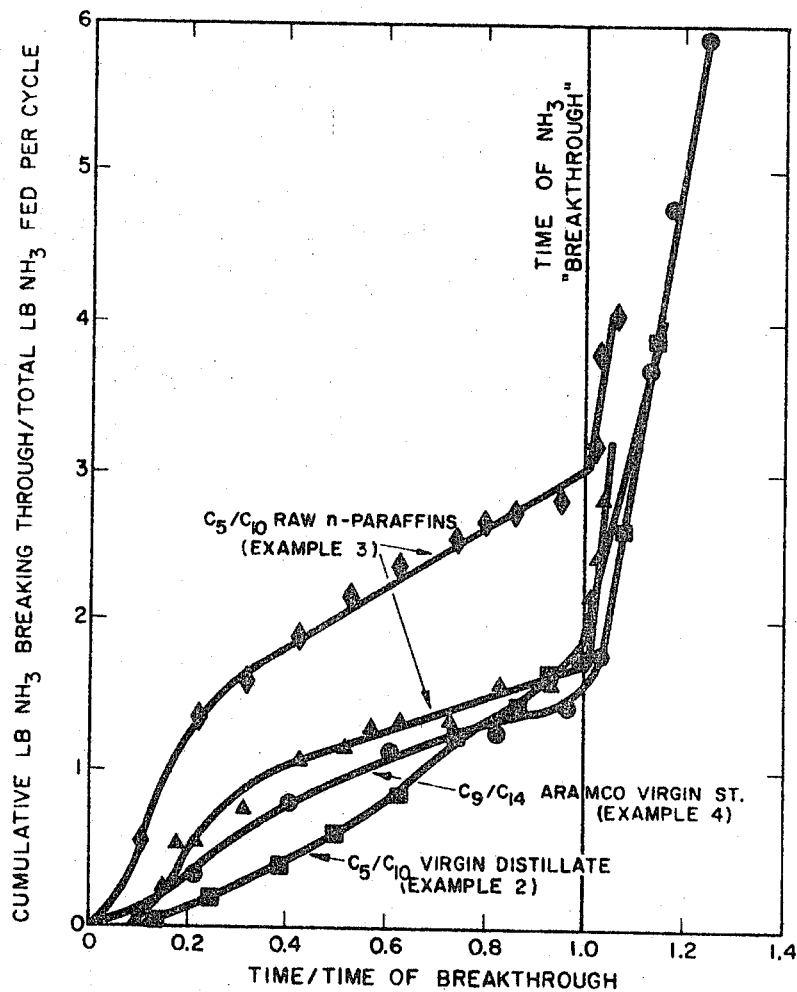

The results shown in FIGURE 5 show that generally ammonia "leaks through" the bed at a slow rate from the start of the desorption step. This may be due to a heel of ammonia left on the desorption outlet end of the bed at the end of adsorption. This "leak" is followed by a sharp increase when the rate for ammonia leaving the bed increases by a factor of 7 to 20. The point at which this sharp increase in ammonia rate occurs is defined as breakthrough. The dimensionless time unit on the X axis was calculated from actual data by dividing each time point observed by the time of breakthrough.

In all of the examples above desorption was carried out countercurrent to adsorption.

*Example 6*

As an illustration of the results obtained using the processes of the invention particularly as described in Examples 1–4, the following feed and product analysis is given.

|  | Feed | 5A Desorbate | 13X Sievate |
| --- | --- | --- | --- |
| n-Paraffins | 25.5 | 93.4 | 95.8 |
| $C_3$ | 0.2 | Trace |  |
| $C_4$ | 2.2 | 0.5 | Trace |
| $C_5$ | 0.3 | 2.9 | 1.0 |
| $C_6$ | 5.6 | 10.9 | 10.3 |
| $C_7$ | 6.4 | 24.1 | 28.6 |
| $C_8$ | 3.8 | 17.9 | 25.4 |
| $C_9$ | 3.9 | 21.6 | 23.6 |
| $C_{10}$ | 2.9 | 14.4 | 6.8 |
| $C_{11}$ | 0.2 | 1.1 | 0.3 |
| Aromatics | 12.7 | 1.6 | 1 1/2 |
| Sulfur[1] |  |  | 1 1 |
| Other | 61.8 | 5.0 | 4.3 |

[1] P.p.m.

Although the invention has been described with some particularity, it will be understood that variations and modifications can be made therein without departing from the spirit of the invention as hereinafter claimed.

What is claimed is:

1. A method of separating n-paraffins from a feed stream comprising n-paraffins and other saturated hydrocarbons which comprises in combination:
    (a) introducing said feed stream comprising n-paraffins and other saturated hydrocarbons into a first adsorbent zone wherein said zone contains adsorbed displacing agent and said adsorbent is composed of molecular sieves having a pore size of about 5 A,
    (b) displacing at least a portion of said displacing agent from said first adsorbent zone with said feed while adsorbing at least a portion of n-paraffins from said feed stream,
    (c) conveying said displaced displacing agent to a second adsorbent zone containing adsorbed n-paraffins, wherein said zone also contains molecular sieves having a pore size of about 5 A,
    (d) removing at least a portion of said adsorbed n-paraffins from said second zone by desorbing with said displacing agent from said first adsorbent while permitting less than 3% of said displacing agent to exit from said second adsorption zone,
    (e) introducing said feed into said second adsorption zone, and
    (f) repeating the above cycle of said displacing, conveying, recovering and introducing.

2. A process according to claim 1 wherein the pressure of adsorption is from 0.5 to 500 p.s.i.a. and the pressure of desorption is from 0.5 to 500 p.s.i.a.

3. A process according to claim 1 wherein the temperature of adsorption is 70 to 800° F. and the temperature of desorption is 70 to 800° F.

4. A process according to claim 1 wherein the feed stream rate is 0.01 to 10 w./w./hr.

5. A process according to claim 1 wherein the $NH_3$ rate is 0.001 to 5 w./w./hr. for desorption.

6. A process according to claim 1 wherein said displacing agent has the general formula:

wherein $R_1$, $R_2$ and $R_3$ are selected from the group consisting of hydrogen and $C_1$ to $C_5$ alkyl radicals.

7. A process according to claim 1 wherein said displacing agent is $NH_3$.

8. A method of separating aromatic hydrocarbons from a feedstream comprising aromatic hydrocarbons and non-aromatic hydrocarbons which comprises in combination: (a) introducing said feedstream into a first adsorbent zone wherein said zone contains adsorbed displacing agent and said adsorbent is composed of type X molecular sieve, (b) displacing at least a portion of said displacing agent from said first adsorbent zone with said feed while adsorbing at least a portion of said aromatic hydrocarbons from said feedstream, (c) conveying said displaced displacing agent to a second adsorbent zone containing adsorbed aromatics, wherein said zone also contains type X molecular sieve, (d) removing at least a portion of said adsorbed aromatics from said second zone by desorbing with said displacing agent from said first adsorbent while permitting less than about 3% of said displacing agent to exit from said adsorption zone, (e) introducing said feed into said second adsorption zone and (f) repeating the above cycle of said displacing, conveying, recovering and introducing.

9. The process of claim 8 wherein said displacing agent has the general formula:

wherein $R_1$, $R_2$ and $R_3$ are selected from the group consisting of hydrogen and $C_1$ to $C_5$ alkyl radicals.

10. The process according to claim 8 wherein said displacing agent is ammonia.

References Cited by the Examiner

UNITED STATES PATENTS

| 2,920,038 | 1/1960  | Feldbauer et al. | 260—676 |
| 2,921,970 | 1/1960  | Gilmore          | 208—310 |
| 2,974,179 | 3/1961  | Fleck et al.     | 260—676 |
| 3,068,627 | 12/1962 | Sherwood         | 260—676 |
| 3,070,542 | 12/1962 | Asher et al.     | 260—676 |

ALPHONSO D. SULLIVAN, *Primary Examiner.*

D. S. ABRAMS, *Assistant Examiner.*